(12) United States Patent
Cen et al.

(10) Patent No.: US 11,341,228 B2
(45) Date of Patent: May 24, 2022

(54) QUICK ACCOUNT LOGIN METHOD, MOBILE TERMINAL, AND APPARATUS WITH STORAGE FUNCTION

(71) Applicant: JRD Communication (Shenzhen) Ltd., Shenzhen (CN)

(72) Inventors: Xiangzhou Cen, Shenzhen (CN); Mei Qin, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 52 days.

(21) Appl. No.: 16/610,036

(22) PCT Filed: May 24, 2018

(86) PCT No.: PCT/CN2018/088170
§ 371 (c)(1),
(2) Date: Oct. 31, 2019

(87) PCT Pub. No.: WO2018/214930
PCT Pub. Date: Nov. 29, 2018

(65) Prior Publication Data
US 2020/0201976 A1 Jun. 25, 2020

(30) Foreign Application Priority Data

May 25, 2017 (CN) .......................... 201710377769.9

(51) Int. Cl.
*G06F 21/00* (2013.01)
*G06F 21/32* (2013.01)
(Continued)

(52) U.S. Cl.
CPC ............ *G06F 21/36* (2013.01); *G06F 9/4451* (2013.01); *G06F 21/40* (2013.01)

(58) Field of Classification Search
CPC ..... H04L 63/0815; H04L 67/30; G06F 21/36; G06F 9/4451; G06F 21/40; G06F 21/41; G06F 21/31; G06F 3/0481; G06F 9/445
See application file for complete search history.

(56) References Cited

U.S. PATENT DOCUMENTS

2009/0222326 A1\* 9/2009 Bryant .................. G06Q 10/06
   705/7.28
2014/0094150 A1   4/2014 Huang
(Continued)

FOREIGN PATENT DOCUMENTS

| CN | 102368848 A | 3/2012 |
| CN | 105956429 A | 9/2016 |
| CN | 107301066 A | 10/2017 |

OTHER PUBLICATIONS

Ali, Zaib; "Use these 3D Touch features for a better Instagram", ioshacker.com, Published: Feb. 27, 2016, Jun. 16, 2021, URL: https://ioshacker.com/how-to/3d-touch-instagram-iphone-ios (Year: 2016).\*

(Continued)

*Primary Examiner* — Alexander Lagor
(74) *Attorney, Agent, or Firm* — Hamre, Schumann, Mueller & Larson, P.C.

(57) ABSTRACT

Disclosed are a quick account login method, a mobile terminal, and an apparatus with a storage function. The method comprises: detecting that a user carries out a first operation on a certain application on a terminal; popping up accounts which can be selected to log into the application; detecting a second operation that the user selects at least two of the accounts which can be selected to log in; and logging into the application using the selected accounts. In this way, the present disclosure simplifies the steps of selecting login (Continued)

accounts by a user, thereby quickly logging into the application using the accounts selected by the user.

13 Claims, 2 Drawing Sheets

(51) Int. Cl.
    *G06F 21/36*     (2013.01)
    *G06F 9/445*     (2018.01)
    *G06F 21/40*     (2013.01)

(56) References Cited

U.S. PATENT DOCUMENTS

2015/0269614 A1*   9/2015   Kramer .............. G06Q 30/0251
                                                                         705/14.49
2018/0227286 A1*   8/2018   Ohsumi .................. H04L 63/08

OTHER PUBLICATIONS

Raymundo, Oscar; "32 free iOS apps that take advantage of 3D Touch on the iPhone 6s", MacWorld, Published: Sep. 30, 2015, Jun. 18, 2021, URL: https://www.macworld.com/article/226449/every-free-ios-app-that-takes-advantage-of-3d-touch-on-the-iphone-6s.html (Year: 2015).*

* cited by examiner

QUICK ACCOUNT LOGIN METHOD, MOBILE TERMINAL, AND APPARATUS WITH STORAGE FUNCTION

CROSS-REFERENCE TO RELATED APPLICATIONS

This application is National Stage of International Application No. PCT/CN2018/088170, filed on May 24, 2018, which claims the priority of China Patent Application serial No. 201710377769.9, filed on May 25, 2017, the disclosures of which are incorporated herein by reference in their entirety.

FIELD OF THE INVENTION

The present disclosure relates to a method of logging in an application, and more particularly to a method of quickly logging in an application, a mobile terminal, and a device having a storage function.

BACKGROUND

In nowadays, a mobile phone's application could allow a user to log in two or more accounts at the same time. However, the conventional log-in mechanism often requires the user to click the icon of the application to open the application and then the user could select different accounts through the application. It requires the user to separately log in different accounts and thus is complicated.

SUMMARY OF THE INVENTION

The technical issue that the embodiment of the present disclosure solves is to provide a method of quick login such that a user could quickly select accounts to log in.

In order to solve the above problem, an embodiment of the present disclosure provides a method of quick login. The method comprises detecting a user's performing a first operation on an application of a terminal; popping up a plurality of accounts of the application for logging in; detecting the user's performing a second operation of selecting at least two accounts of the plurality of accounts; and using the selected accounts to log in the applications.

In order to solve the above problem, another embodiment of the present disclosure provides a mobile terminal. The mobile terminal comprises a human-machine circuit; and a processor, working in corporation with the human-machine circuit to implement operations of: detecting a user's performing a first operation on an application of a terminal; popping up a plurality of selectable accounts of the application for logging in; detecting the user's performing a second operation of selecting at least two accounts of the plurality of selectable accounts; and using the selected accounts to log in the applications.

In contrast to the prior art, the present disclosure could allow a user to quickly select accounts for login.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, but is not intended to limit the present disclosure.

Figure 1:
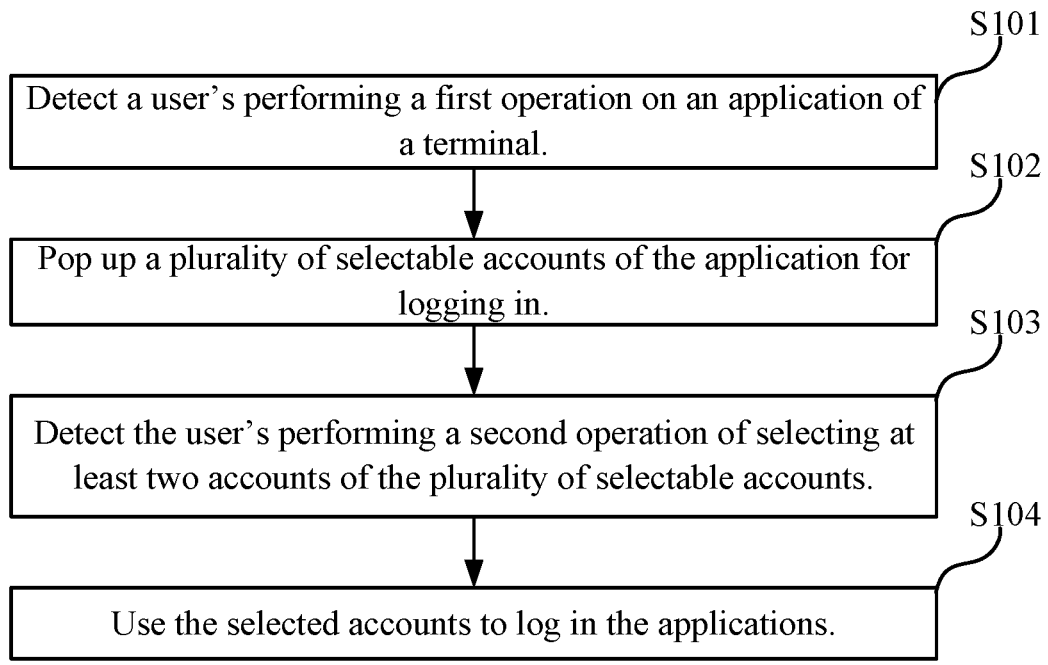
FIG. 1 is a flow chart showing a method of quick login according to an embodiment of the present disclosure.

Please refer to FIG. 1, which is a flow chart showing a method of quick login according to an embodiment of the present disclosure. The method of quick login comprises:

Step 101: Detect a user's performing a first operation on an application of a terminal.

In an embodiment, the mobile terminal detects that a user long pushes an application of the mobile terminal. In another embodiment, a user could double click an application of the mobile terminal. Then, the mobile terminal firstly determines whether this application could support the multi-account login function or the user only has one account of this application. If this application does not support the multi-account login function or the user has only one account of this application, then the mobile terminal activates the application. Otherwise, the mobile terminal pops up a plurality of selectable accounts of the application for logging in.

Step 102: Pop up a plurality of selectable accounts of the application for logging in.

Figure 3:
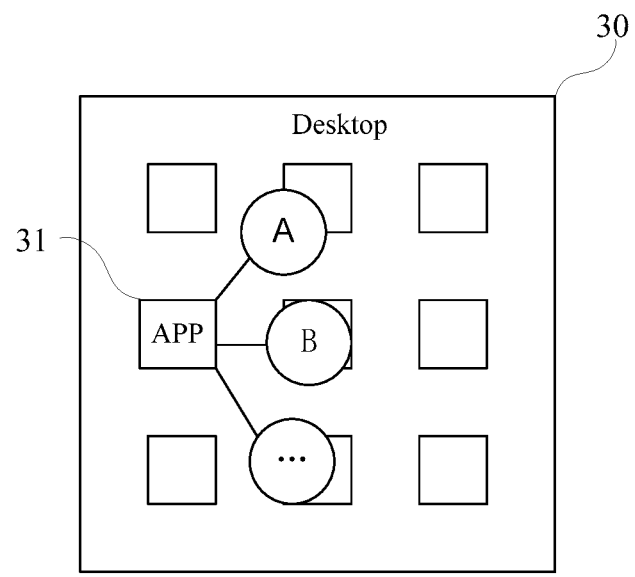
FIG. 3 is a diagram showing a displaying image of popped-up selectable accounts displayed on the mobile terminal according to an embodiment of the present disclosure.

Please refer to FIG. 3 in conjunction with FIG. 1. FIG. 3 is a diagram showing a displaying image of popped-up selectable accounts displayed on the mobile terminal according to an embodiment of the present disclosure. After the user long push the application 31 on the desktop 30 of the mobile terminal, two selectable accounts A and B and a virtual icon 311 of setting menu are popped up. In this embodiment, the selectable accounts A and B and a virtual icon 311 of setting menu are placed in a radial shape around the application 31. In another embodiment, the selectable accounts A and B and a virtual icon 311 of setting menu could be arranged in a row or a column close to the application 31. In addition, in this embodiment, the accounts are arranged in an order according to their using frequency. That is, the account A, which has been used more frequently, is arranged prior to the account B, which has been used less frequently. In another embodiment, the accounts could be arranged according to the time of their latest use. That is, the account which had been used the latest is arranged on the top and the account which had been used the last is arranged on the bottom.

The virtual icon 311 of setting menu is used to set a display effect, an display order, a display number of the plurality of selectable accounts, adding an selectable account, or deleting one of the plurality of selectable accounts. For example, the user could determine whether the selectable accounts should be represented by the account numbers or the user images, whether the selectable accounts should be arranged in a radial shape or lined up in a row or a column. In addition, the user could manually adjust the order of the selectable accounts. Further, if the selectable accounts are too many such that they cannot be displayed in one page, the user could determine the number of the selectable accounts shown in one page. Moreover, the user could add a new selectable account or delete an account from the selectable accounts. All the above-mentioned operations could be set through the setting menu.

Step 103: Detect the user's performing a second operation of selecting at least two accounts of the plurality of selectable accounts.

In this embodiment, the user could keep long pushing while sliding his finger to a selected account. After the mobile terminal detects this operation, the mobile terminal determines that the user selects this account for login. In another embodiment, the user could click the selectable account instead to select it.

In another embodiment, the mobile terminal could detect that the user sets the setting menu instead of an account. Then, the setting interface is popped up to make corresponding changes in order to meet the user's demands according to the user's settings of the display effect, the display order, the display number or other parameters of the plurality of selectable accounts, adding an selectable account, or deleting one of the plurality of selectable accounts.

Step 104: Use the selected accounts to log in the applications.

After detecting that the user long push the application, the mobile terminal does not activate the application immediately. Instead, the mobile terminal directly uses the selected accounts to log in the application after the user selects some accounts from the selectable accounts.

In another embodiment, the user selects the setting menu instead of the accounts. In this case, the mobile terminal pops up the setting menu instead of activating the application to allow the user to adjust the display effect, the display order, the display number or other parameters of the plurality of selectable accounts, add an selectable account, or delete one of the plurality of selectable accounts. After the user uses the setting menu to make the adjustments, the user could go back to the step 101 to check if the user is satisfied with the settings or the user could select one or more accounts to log in the application.

In another embodiment, after the user completes the setting, the user does not need to go back to step 101. Instead, the user could directly go to the step 102 such that the mobile terminal could display an adjusted display interface according to the user's adjusted settings. Then, the user could use select one or more accounts to log in.

From the above, an embodiment of the present disclosure could skip some complicated steps so the user do not have to activate the application first and then select the account to log in. Instead, the user could select one or more accounts before activating the application and directly use the selected accounts to log in the application. This is simple and fast.

Figure 2:
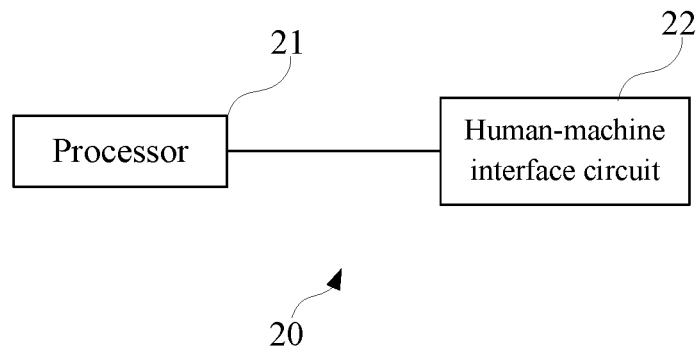
FIG. 2 is a diagram showing a mobile terminal according to an embodiment of the present disclosure.

Please refer to FIG. 2, which shows a mobile terminal according to an embodiment of the present disclosure. The mobile terminal 20 comprises a processor 21 and a human-machine circuit 22. The human-machine circuit 22 is used to perform a human-machine interaction. For example, the human-machine circuit 22 is used to detect the user's operation, display the content for the user. The processor 21 processes the information detected by the human-machine circuit 22 and controls the human-machine circuit 22 to perform the human-machine interaction.

Please refer to FIG. 3 again. The human-machine circuit 22 detects that the user long pushes the application 31 and the processor 21 checks whether the application 31 supports multi-account login function or the user only has one account. If the application 31 does not support multi-account login function or the user only has one account, the processor 21 immediately opens the application. Otherwise, the processor 21 controls the human-machine circuit 22 to display the interface shown in FIG. 3 instead of opening the application. That is, the selectable accounts A and B are popped up around the application 31. In this embodiment, the number of the selectable accounts is two. However, this number is only an example, not a limitation of the present disclosure. The number could be three, five or more. Further, as previously mentioned, the icon of the setting menu 31 is also popped up. Then, the human-machine circuit 22 detects if the user's finger is sliding to one of the selectable account (for example, the account A). If so, the processor 21 activates the application 31 and uses the account A to log in the application. Further, the processor 31 also controls the human-machine circuit 22 to report the login condition to the user.

If the human-machine circuit 22 detects that the user's finger is sliding to the icon of the setting menu 311, the processor 21 controls the human-machine circuit 22 to pop up the setting menu for the user to change the settings. The human-machine circuit 22 detects that the user changes the settings through the setting menu and then the processor 21 changes the settings accordingly and controls the human-machine circuit 22 to display according to the adjusted settings.

From the above, an embodiment of the present disclosure can use the processor and the human-machine circuit to allow the user to select accounts for login before opening the application. In this way, the user could directly use selected accounts to log in the application. It's simple and convenient.

Figure 4:
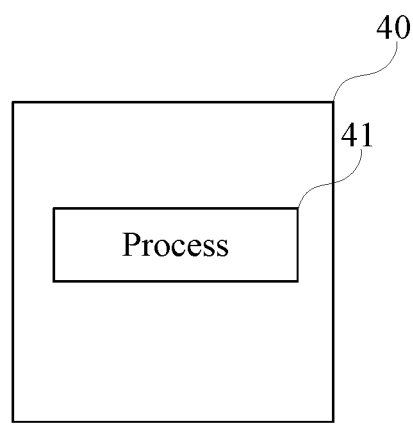
FIG. 4 is a diagram showing a storage device according to an embodiment of the present disclosure.

Please refer to FIG. 4. FIG. 4 is a diagram showing a storage device according to an embodiment of the present disclosure. The storage device 40 comprises a process 41, which could be executed to perform the aforementioned method of quick login shown in FIG. 1. In an embodiment, the storage device 41 could a storage chip in the mobile terminal or a removable storage device inserted into the mobile terminal.

From the above, the process stored in the storage device could the user to select accounts for login before opening the application. In this way, the user could directly use selected accounts to log in the application. It's simple and convenient.

In contrast to the conventional art, which requires the user to open the application first and then select an account to log in the application, the present disclosure could allow the user to select one or more accounts before opening the application. This method is simple and convenient and improves the user experiences.

Above are embodiments of the present disclosure, which does not limit the scope of the present disclosure. Any modifications, equivalent replacements or improvements within the spirit and principles of the embodiment described above should be covered by the protected scope of the invention.

What is claimed is:

1. An apparatus comprising:
a storage device, configured to store instructions; and
a processor, configured to execute the instructions to perform at least following operations:
   detecting a user's performing a first operation on an application of a terminal;
   popping up a plurality of selectable accounts of the application for logging in;
   arranging an order of displaying the plurality of selectable accounts according to log-in frequencies of the plurality of selectable accounts;
   detecting the user's performing a second operation of selecting at least two accounts of the plurality of selectable accounts; and
   using the selected accounts to log in the applications,
wherein the first operation comprises holding down or double clicking a desktop icon of the application,
wherein the second operation comprises clicking an account of the plurality of the selectable accounts or sliding to the account of the plurality of selectable accounts to select the account under first operation.

2. The apparatus of claim 1, wherein the operation of detecting the user's performing the first operation on the application of the terminal comprises:
   detecting whether the user has at least two selectable accounts and opening the application in a condition that the user does not have at least two selectable accounts.

3. The apparatus of claim 1, the operation of popping up the plurality of accounts of the application for logging in comprises:
   popping up a setting menu for setting a display effect, a display order, a display number of the plurality of selectable accounts, adding a selectable account, or deleting one of the plurality of selectable accounts; and
   entering a setting interface in a condition that the user's performing the second operation on the setting menu is detected.

4. The apparatus of claim 1, wherein the operation of popping up the plurality of accounts of the application for logging in comprises:
   popping up the plurality of selectable accounts before opening the application.

5. A method of quick login, comprising:
   detecting a user's performing a first operation on an application of a terminal;
   popping up a plurality of selectable accounts of the application for logging in;
   arranging an order of displaying the plurality of selectable accounts according to log-in frequencies of the plurality of selectable accounts;
   detecting the user's performing a second operation of selecting at least two accounts of the plurality of selectable accounts; and
   using the selected accounts to log in the applications,
wherein the first operation comprises: holding down or double clicking a desktop icon of the application, and
wherein the second operation comprises: clicking an account of the plurality of the selectable accounts or sliding to the account of the plurality of selectable accounts to select the account under first operation.

6. The method of claim 5, wherein the step of detecting the user's performing the first operation on the application of the terminal comprises:
   detecting whether the user has at least two selectable accounts and opening the application in a condition that the user does not have at least two selectable accounts.

7. The method of claim 5, the step of popping up the plurality of accounts of the application for logging in comprises:
   popping up a setting menu for setting a display effect, a display order, a display number of the plurality of selectable accounts, adding a selectable account, or deleting one of the plurality of selectable accounts.

8. The method of claim 7, further comprising:
   entering a setting interface in a condition that the user's performing the second operation on the setting menu is detected.

9. A mobile terminal comprising:
a human-machine interface circuit; and
a processor, working in corporation with the human-machine interface circuit to implement operations of:
   detecting a user's performing a first operation on an application of a terminal;
   popping up a plurality of selectable accounts of the application for logging in;
   arranging an order of displaying the plurality of selectable accounts according to log-in frequencies of the plurality of selectable accounts;
   detecting the user's performing a second operation of selecting at least two accounts of the plurality of selectable accounts; and
   using the selected accounts to log in the applications,
wherein the first operation comprises: holding down or double clicking a desktop icon of the application, and
wherein the second operation comprises: clicking an account of the plurality of the selectable accounts or sliding to the account of the plurality of selectable accounts to select the account under first operation.

10. The mobile terminal of claim 9, wherein the operation of detecting the user's performing the first operation on the application of the terminal comprises:
   detecting whether the user has at least two selectable accounts and opening the application in a condition that the user does not have at least two selectable accounts.

11. The mobile terminal of claim 9, the operation of popping up the plurality of accounts of the application for logging in comprises:
   popping up a setting menu for setting a display effect, a display order, a display number of the plurality of selectable accounts, adding a selectable account, or deleting one of the plurality of selectable accounts.

12. The mobile terminal of claim 9, wherein the processor working in corporation with the human-machine interface circuit further implements an operation of:
   entering a setting interface in a condition that the user's performing the second operation on the setting menu is detected.

13. The mobile terminal of claim 9, wherein the operation of popping up the plurality of accounts of the application for logging in comprises:
   popping up the plurality of selectable accounts before opening the application.

* * * * *